(12) United States Patent
Aullas et al.

(10) Patent No.: US 9,286,194 B2
(45) Date of Patent: Mar. 15, 2016

(54) DATA PROCESSING SYSTEM (71) Applicant: International Business Machines Corporation, Armonk, NY (US)

(72) Inventors: Erwan Aullas, Paris (FR); Damien Adrien Francois Garbarino, Vallauris (FR); Christophe Jean Louis Jolif, Le Raincy (FR); Frederic Joel Denis Leroy, Gentilly (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 13/859,154

(22) Filed: Apr. 9, 2013

(65) Prior Publication Data

US 2013/0268884 A1   Oct. 10, 2013

(30) Foreign Application Priority Data

Apr. 10, 2012   (GB) .................................. 1206279.0

(51) Int. Cl.
    *G06F 3/048*    (2013.01)
    *G06F 11/36*    (2006.01)
    *G06F 3/0489*    (2013.01)
    *G06F 3/0484*    (2013.01)
    *G06Q 10/06*    (2012.01)

(52) U.S. Cl.
    CPC ............ *G06F 11/3672* (2013.01); *G06F 3/048* (2013.01); *G06F 3/0489* (2013.01); *G06F 3/04842* (2013.01); *G06Q 10/06* (2013.01)

(58) Field of Classification Search
None
See application file for complete search history.

(56) References Cited

U.S. PATENT DOCUMENTS

| 6,854,088 | B2 | 2/2005 | Massengale et al. |
| 7,562,313 | B2 | 7/2009 | Haug |
| 7,688,322 | B2 | 3/2010 | Kapler et al. |
| 8,073,955 | B1 * | 12/2011 | Gagnon ................ H04H 60/25 709/203 |
| 2003/0137541 | A1 | 7/2003 | Massengale et al. |

(Continued)

FOREIGN PATENT DOCUMENTS

| DE | 19621062 A1 | 11/1997 |
| WO | 2010008710 A2 | 1/2010 |

OTHER PUBLICATIONS

"Conditional Navigation of Gantt Chart Data." Retrieved from the IP.com Prior Art Database, IP.con No. IPCOM000204075D, IP.com Electronic Publication Feb. 10, 2011. http://priorartdatabase.com/IPCOM/000204075.

(Continued)

*Primary Examiner* — Matt Kim
*Assistant Examiner* — Hua Lu
(74) *Attorney, Agent, or Firm* — Cantor Colburn LLP (57) ABSTRACT

Embodiments relate to a method, system and computer program product for operating a data processing system. The data processing system includes a display device, a processing device connected to the display device, and one or more user input devices connected to the processing device. The display device is configured to display a Gantt chart comprising a plurality of tasks and a plurality of constraints. Each constraint connects two tasks. A method comprises highlighting a task in the Gantt chart. In response to receiving a forward user input, the method further comprises highlighting a constraint exiting a previously highlighted task in the Gantt chart, or in response to receiving a back user input, highlighting a constraint entering the previously highlighted task in the Gantt chart.

15 Claims, 9 Drawing Sheets

(56) References Cited

U.S. PATENT DOCUMENTS

| | | | |
|---|---|---|---|
| 2004/0119713 A1* | 6/2004 | Meyringer | G06Q 10/06 345/440 |
| 2006/0238538 A1 | 10/2006 | Kapler et al. | |
| 2007/0087775 A1* | 4/2007 | Richardson | H04M 1/72552 455/550.1 |
| 2007/0150327 A1* | 6/2007 | Dromgold | G06F 17/30551 705/7.17 |
| 2007/0219842 A1* | 9/2007 | Bansal | G06Q 10/06 715/810 |
| 2007/0245300 A1* | 10/2007 | Chan | G06Q 10/06 717/105 |
| 2008/0027776 A1* | 1/2008 | Sourov | G06Q 10/06313 705/7.23 |
| 2008/0294663 A1* | 11/2008 | Heinley | G06F 3/0481 |
| 2010/0257106 A1* | 10/2010 | Iyer | G06Q 10/06 705/300 |
| 2010/0306018 A1* | 12/2010 | Burtner | G06Q 10/10 705/7.19 |
| 2013/0227412 A1* | 8/2013 | Ornstein | G06F 3/04847 715/711 |

OTHER PUBLICATIONS

Derthick, M. and Smith, S. "An Interactive 3D Visualization for Requirements Analysis." Copyright, 1999, American Association for Artificial Intelligence.

GB Search Report dated Jul. 23, 2012 for GB Application No. GB1206279.0.

"Navigating using Gantt Charts." Techcenter—Visio 2010 Forums. Feb. 27, 2010. Retrieved from the interner on the Jul. 17, 2012 via: http://social.technet.microsoft.com.Forums/en-US/visiogeneral/thread.c74b1d43-c777-4f6c-abad-609caf074edb/.

* cited by examiner

DATA PROCESSING SYSTEM

PRIORITY

This application claims priority to United Kingdom Patent Application No. GB 1206279.0, filed Apr. 10, 2012, and all the benefits accruing therefrom under 35 U.S.C. §119, the contents of which in its entirety are herein incorporated by reference.

BACKGROUND

This disclosure relates to a method of operating a data processing system and to the data processing system. In one embodiment, the disclosure provides an interaction design for Gantt chart keyboard navigation on task chart patterns.

Figure 1:
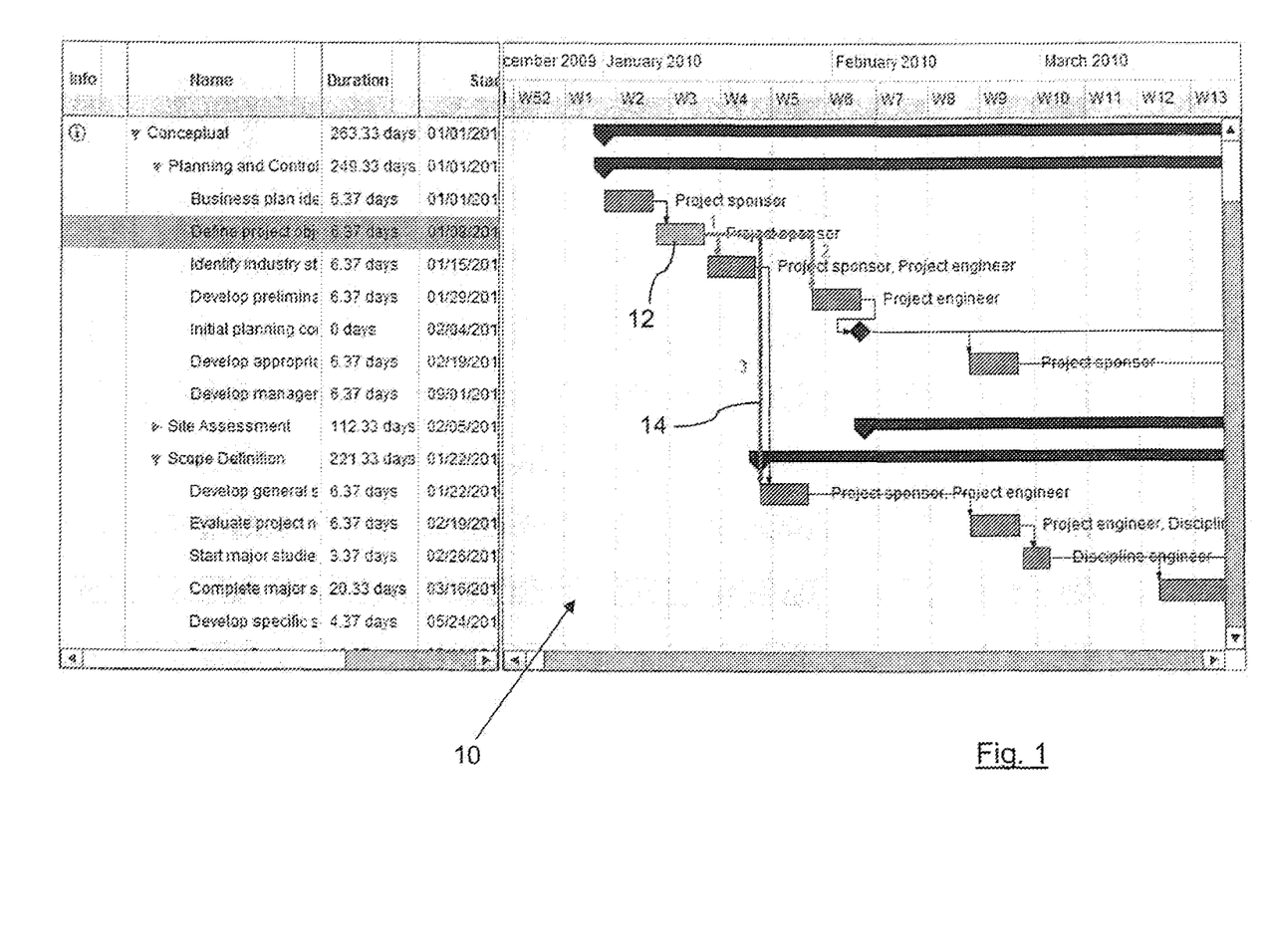
FIGS. 1-6 are schematic diagrams of Gantt charts.

A Gantt chart is a type of bar chart that may be used to illustrate a project schedule. FIG. 1 shows an example of a task-oriented Gantt chart 10. The Gantt chart 10 includes a plurality of tasks 12 and a plurality of constraints 14, where each constraint 14 connects two tasks 12. Gantt charts can be used to illustrate the start and finish dates of terminal elements and summary elements of a project. Terminal elements and summary elements include the work breakdown structure of the project. Task-oriented Gantt charts also show the dependency (precedence) relationships between activities (tasks). Gantt charts can be used to show current schedule status using percent-complete shadings and a vertical current line.

In the conventional presentation of a task-oriented Gantt chart, there may be issues with the on-screen navigation of elements within the Gantt chart. Solutions for Gantt chart navigation already exist, but only apply to the Gantt grid part, and not to the Gantt sheet part. Due to this restriction they only allow a user, in a task-oriented Gantt chart, to access the various tasks, but not the constraints. Hence, current methods of presenting and navigating a task-oriented Gantt chart do not fully allow access to the Gantt chart data with a keyboard, and additionally they can lose the logic existing within the Gantt chart of the constraints between tasks when navigating with the keyboard.

SUMMARY

According to one embodiment, a method of operating a data processing system is provided. The data processing system includes a processing device connected to the display device and one or more user input devices connected to the processing device. The display device is configured to display a Gantt chart including a plurality of tasks and a plurality of constraints. Each constraint connects two tasks. The method includes highlighting a task in the Gantt chart. In response to receiving a forward user input, the method further includes highlighting a constraint exiting the previously highlighted task in the Gantt chart, or in response to receiving a back user input, highlighting a constraint entering the previously highlighted task in the Gantt chart. In response to receiving a down user input, the method further includes highlighting the next lower displayed constraint connecting to the previously highlighted task in the Gantt chart, or in response to receiving an up user input, highlighting the next higher displayed constraint connecting to the previously highlighted task in the Gantt chart.

According to another embodiment, a data processing system including a display device, a processing device connected to the display device, and one or more user input devices connected to the processing device is provided. The display device is configured to display a Gantt chart including a plurality of tasks and a plurality of constraints. Each constraint connects two tasks. The display device is configured to highlight a task in the Gantt chart. In response to receiving a forward user input, the display device is configured to highlight a constraint exiting the previously highlighted task in the Gantt chart, or in response to receiving a back user input, highlight a constraint entering the previously highlighted task in the Gantt chart. In response to receiving a down user input, the display device is configured to highlight the next lower displayed constraint connecting to the previously highlighted task in the Gantt chart, or in response to receiving an up user input, highlight the next higher displayed constraint connecting to the previously highlighted task in the Gantt chart.

According to yet another embodiment, a computer program product for navigating a Gantt chart is provided. The computer program product comprises a computer readable storage medium having computer readable program code embodied therewith. The computer readable program code is executable by a processing device to highlight a task in the Gantt chart. The Gantt chart comprises a plurality of tasks and a plurality of constraints. Each constraint connects two tasks. The computer readable program code is executable by the processing device to highlight a task in the Gantt chart. In response to receiving a forward user input, the computer readable program code is executable by the processing device to highlight a constraint exiting the previously highlighted task in the Gantt chart, or in response to receiving a back user input, highlight a constraint entering the previously highlighted task in the Gantt chart. In response to receiving a down user input, the computer readable program code is executable by the processing device to highlight the next lower displayed constraint connecting to the previously highlighted task in the Gantt chart, or in response to receiving an up user input, highlight the next higher displayed constraint connecting to the previously highlighted task in the Gantt chart.

Additional features and advantages are realized through the techniques of the present disclosure. Other embodiments and aspects of the disclosure are described in detail herein and are considered a part of the disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

The improved method of navigating a task-oriented Gantt chart defines how a series of keyboard actions allow a user to navigate the task-oriented Gantt chart. For such a task-oriented Gantt chart, a user will navigate the chart by following the constraints between the various tasks (using the left arrow key going inside prerequisite constraints and the right arrow key going inside post task constraints). In both cases by using the up and down arrow keys the user is able to move one row up or down in the Gantt chart. FIG. 1 shows a screenshot showing the navigation process on a task oriented Gantt chart 10 with the improved interaction. The task-oriented Gantt chart 10 is made up of a plurality of tasks 12 and a plurality of constraints 14, where each constraint 14 connects two tasks 12. A task 12 can have any number of constraints 14 entering or exiting the specific task 12.

In FIG. 1, the specific task numbered 12 is highlighted. By pressing the right arrow key on their keyboard, the user enters a constraints selection cycle, and constraint 1 is highlighted. Pressing the down arrow key selects and highlights the next post constraint 2, and pressing the down arrow key again selects and highlights the third post constraint. Pressing the right arrow key when any of those constraints is selected and highlighted would select the task at the other end of the constraint. This solution gives full access to all tasks and constraints using only a keyboard, which is important to improve the accessibility of Gantt charts. It is also intuitive as it separates the "from" and "to" constraint navigation instead of having them navigated together. Finally, advanced use cases such a right-to-left displays can be taken into account by the navigation design.

After access has been given to a task-oriented Gantt chart, the user may use the arrow keys to navigate to a task. The display of the Gantt chart will default to highlighting the first (top-most) task in the Gantt chart on the first visible row. The user may then use the up and down arrow keys to navigate to further tasks. If a user presses the down or up arrow keys the interaction design will respectively navigate to the task on an immediately lower or upper row. If the user reaches the first or last row of the Gantt chart then the user may continue navigating back respectively from the end of the row list or from the start, supporting a wrap-around functionality for the user.

Figure 2:
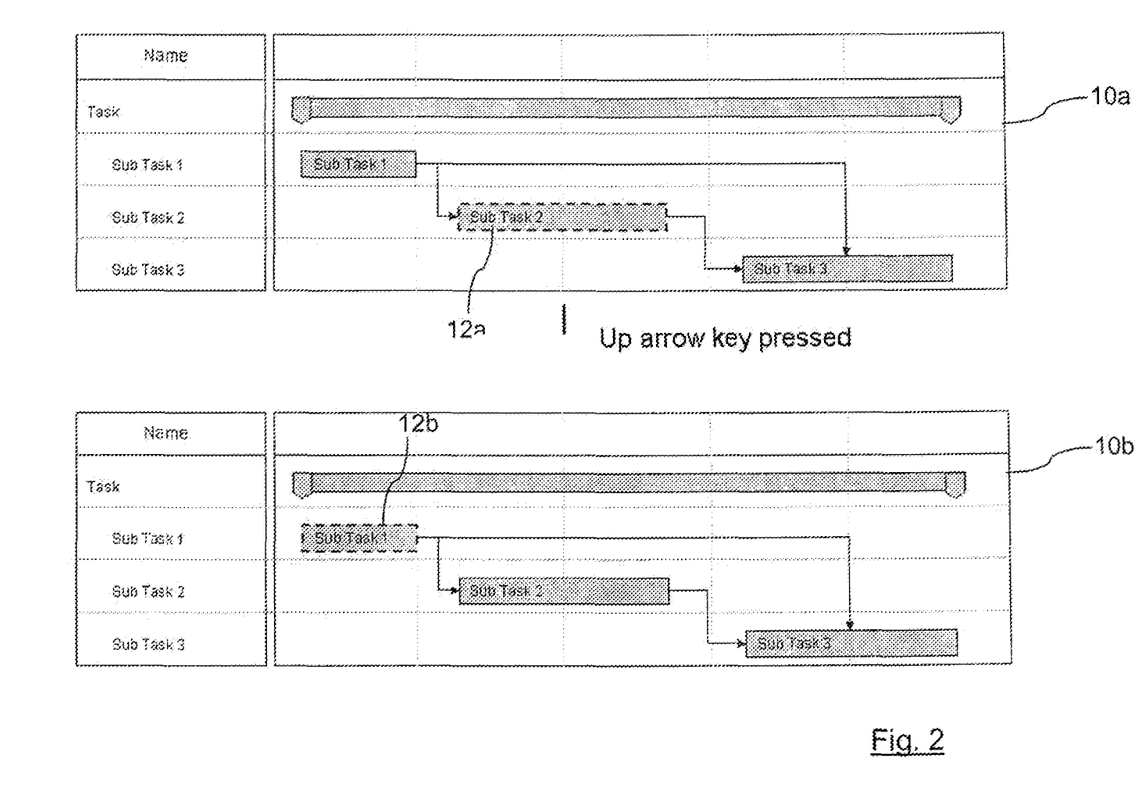

FIG. 2 illustrates the effect of pressing the up arrow key when a task is highlighted. In the upper Gantt chart 10a of FIG. 2, a task 12a is currently highlighted. When the up arrow key is pressed by the user on their keyboard, the task 12b is now highlighted instead, as shown in the lower Gantt chart 10b of the Figure. It will be appreciated that repeated pressing of the up and down arrow keys will cycle through the different tasks 12 that are part of the Gantt chart. No constraints will ever be selected by using the up and down arrow keys when a task is currently highlighted. As discussed above, the cycling through the tasks will wrap-around the entire Gantt chart. For example, if the Sub Task 3 is highlighted and the user presses the down arrow key, then the top task will be highlighted instead.

Figure 3:
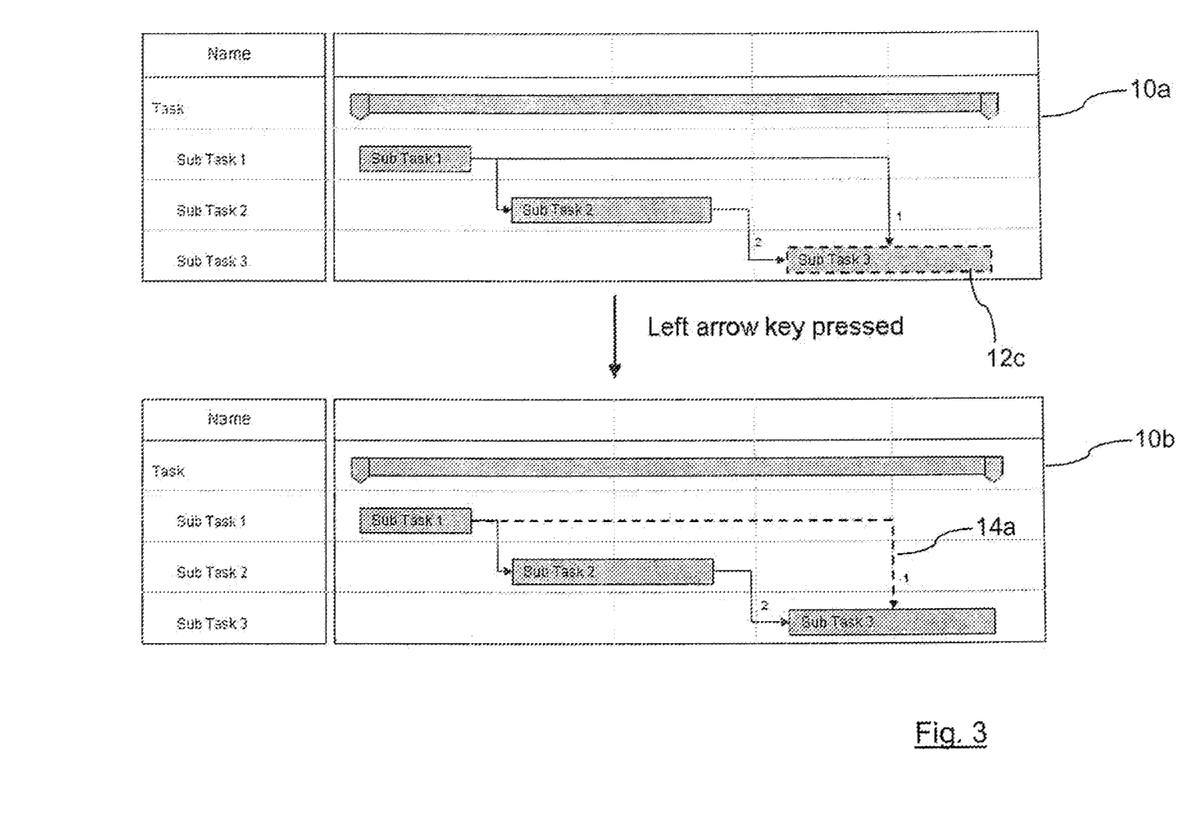

FIG. 3 illustrates the effect of pressing the left arrow key when a task is highlighted. In the upper Gantt chart 10a of FIG. 3, the task 12c is currently highlighted. When the left arrow key is pressed by the user, the constraint 14a is now highlighted instead, as shown in the lower Gantt chart 10b of the Figure. If a user presses the left arrow key while a task is highlighted, the interaction design navigates to the bundle of prerequisite constraints (represented by incoming links going to the highlighted task on the display) of the task (if the display is a right to left mirrored displays then it navigates to the post constraints bundle instead) and highlights a single constraint, here defaulting to the top constraint 14a.

In one embodiment of the navigation method, a list of stored user constraints and tasks previously visited may be maintained. If the previously stored constraint is not in the list of the prerequisite constraints bundle then the method automatically navigates to the first constraint in the bundle list (as in FIG. 3). However, if the previously stored constraint is in the list of the prerequisite constraints bundle then the method automatically navigates to this constraint. This ensures that when going back to a constraint bundle the user has just left, the method will end up navigating to the constraint that was previously highlighted, allowing the user to quickly go back to the previous position.

Figure 4:
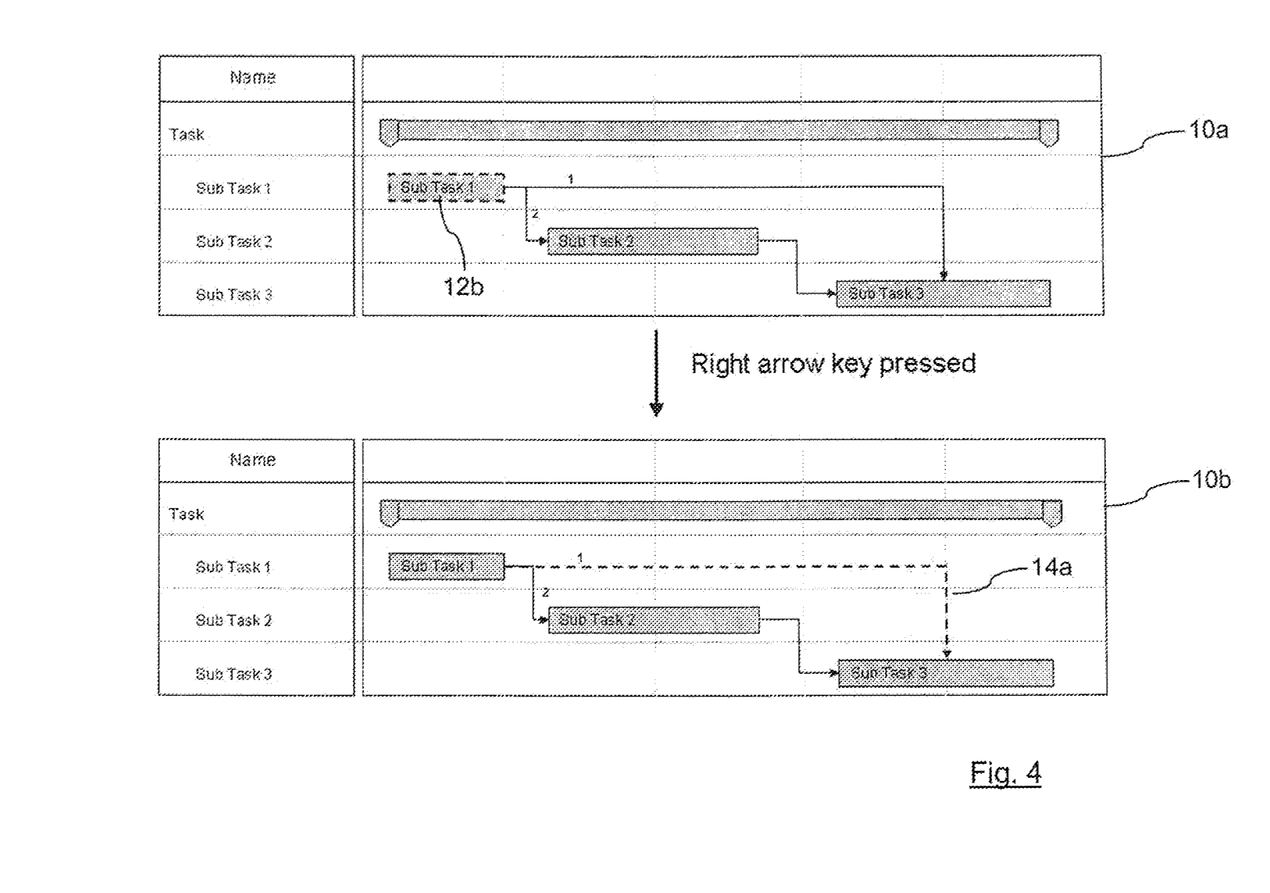

FIG. 4 illustrates the effect of pressing the right arrow key when a task is highlighted. In the upper Gantt chart 10a of FIG. 4, the task 12b is currently highlighted. When the right arrow key is pressed by the user, the constraint 14a is now highlighted instead, as shown in the lower Gantt chart 10b of the Figure. When a user presses the right arrow key, while a task is highlighted, the interaction design navigates to the bundle of post constraints (represented by outgoing links coming from the task currently highlighted) of the task (if the display is a right to left mirrored displays then it navigates to the prerequisite constraints bundle instead) and highlights a single constraint, here defaulting to the top constraint 14a.

As above, a methodology may be used such that if the previously stored constraint is not in the list of the post constraints bundle then the method automatically navigates to the first constraint in the bundle list. However, if the previously stored constraint is in the list of the post constraints bundle then automatically navigate to this constraint. This ensures that going back to a constraint bundle that was just left, a user will end up navigating to the constraint that was previously onto, allowing the user to quickly go back to the previous position.

Figure 5:
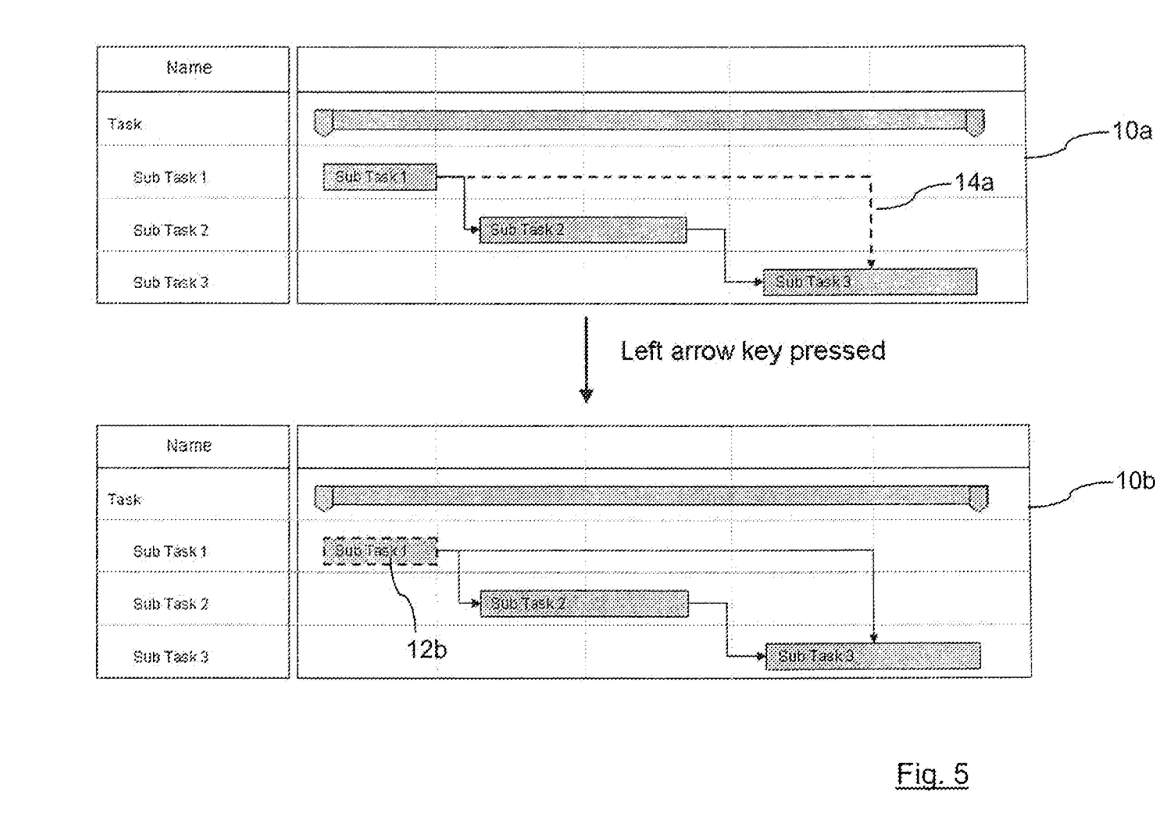

Once the user has navigated to a constraint, the user may use the arrow keys to navigate to other constraints on the same bundle or to further tasks. Such an example is shown in FIG. 5. FIG. 5 illustrates the effect of pressing the left arrow key when a constraint is highlighted. In the upper Gantt chart 10a of FIG. 5, the constraint 14a is currently highlighted. When the left arrow key is pressed by the user, the task 12b is now highlighted instead, as shown in the lower Gantt chart 10b of the Figure. If the user presses the left arrow key while being on a constraint, the interaction design navigates to the origin (prerequisite) task of the constraint (conversely in a right to left mirrored display it navigates to the destination task of the constraint). Similarly, if the user presses the right key while being on a constraint the interaction design navigates to the destination (post) task of the constraint (conversely in a right to left mirrored display it navigates to the origin task of the constraint).

Figure 6:
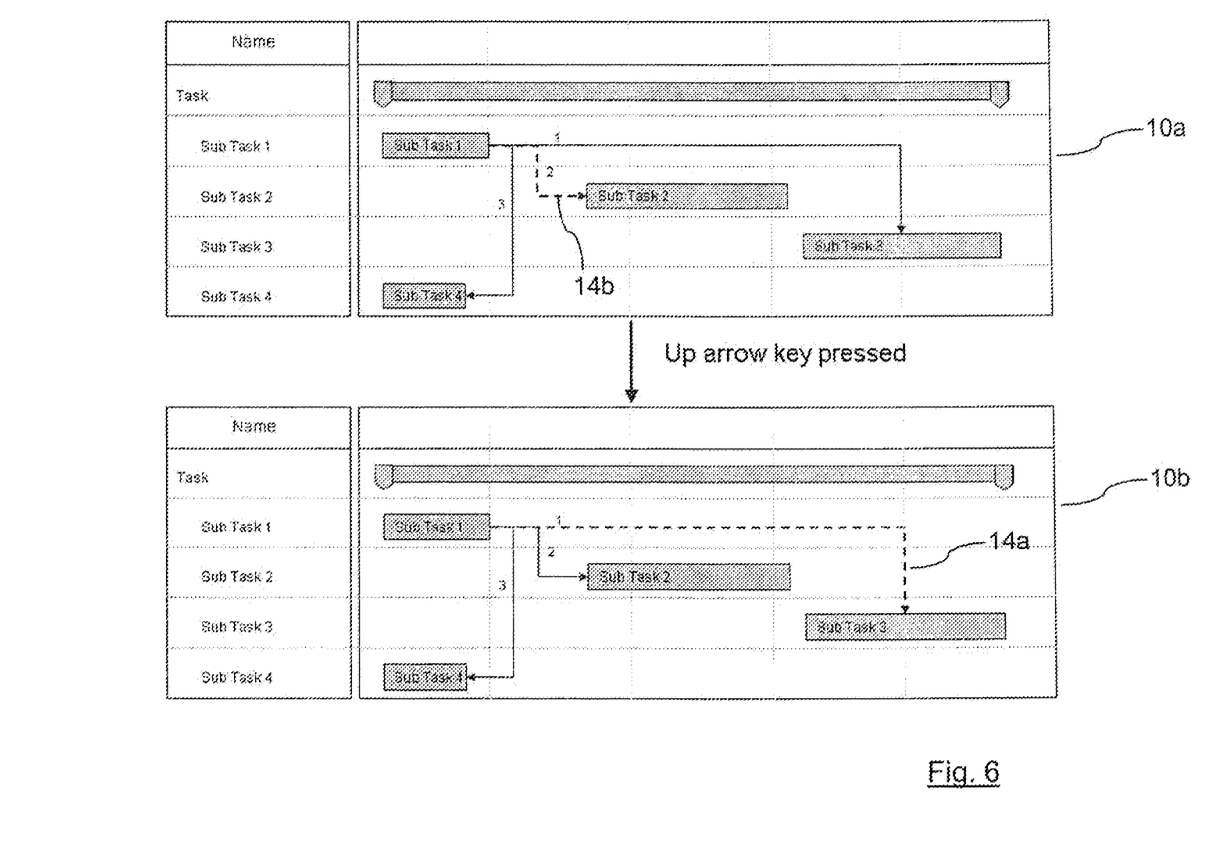

The up and down arrow keys may also be used when a constraint is highlighted in order to cycle through the constraints in the bundle currently selected. Such an example is shown in FIG. 6. This Figure illustrates the effect of pressing the up arrow key when a constraint is highlighted. In the upper Gantt chart 10a of FIG. 6, the constraint 14b is currently highlighted. When the up arrow key is pressed by the user, the constraint 14a is now highlighted instead, as shown in the lower Gantt chart 10b of the Figure. If the user presses the up arrow key while being on a constraint the interaction design navigates the next higher constraint in the current constraints bundle. Similarly, if the user presses the down key while being on a constraint the interaction design navigates the next lower constraints in the current constraints bundle.

Figure 7:
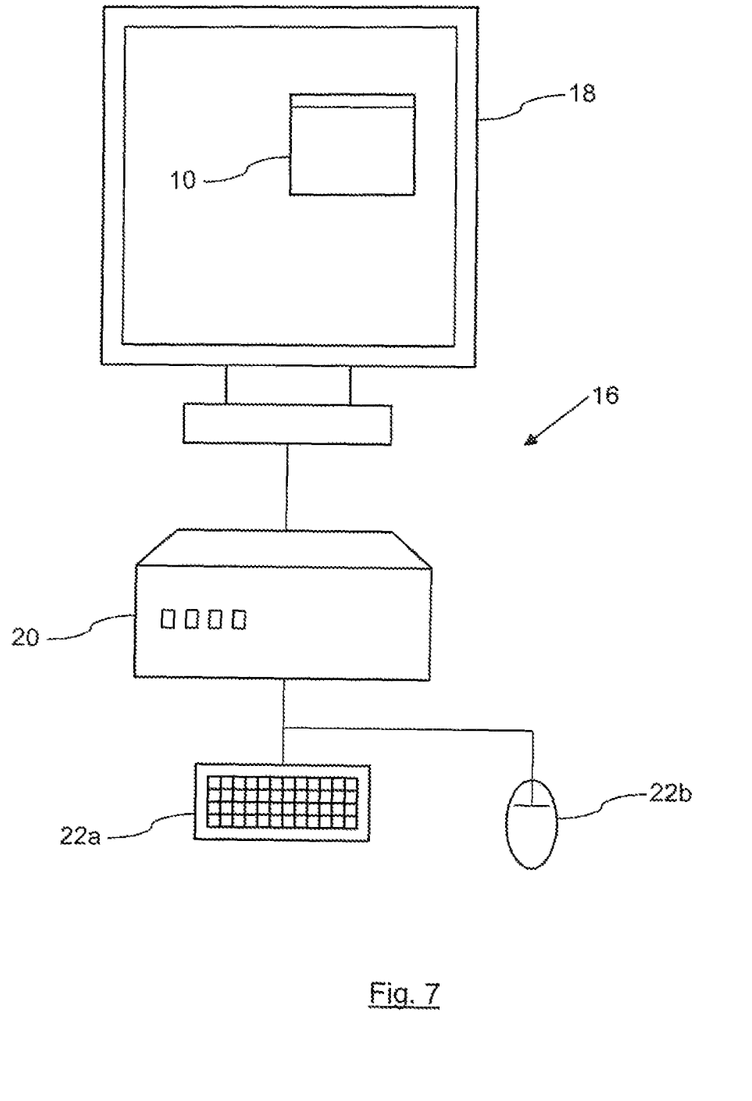
FIG. 7 is a schematic diagram of a data processing system.

FIG. 7 illustrates a data processing system 16, which is an example of the type of system that can be utilised by a user in order to navigate the Gantt chart 10. The data processing system 16 comprises a display device 18, a processing device 20 connected to the display device 18 and user input devices 22 connected to the processing device 20. The display device 18 is configured to display the Gantt chart 10, which comprises a plurality of tasks and a plurality of constraints, each constraint connecting two tasks. The user input devices 22 are a keyboard 22a and a mouse 22b. In this example, the data processing system 16 is a conventional desktop computer.

The user can use the keyboard 22a to navigate the Gantt chart 10 using only four different keys of the keyboard 22a. These four keys provide logical forward, back, up and down movements, and these logical actions may be mapped to the cursor keys of a conventional keyboard, which provide left, right, up and down arrows. The specifics of the navigation are detailed above, but the general principle is that the user can navigate the entire Gantt chart using only these four keys in a manner that is simple and logical. The user can move from task to task, from constraint to constraint and from task to constraint (and vice versa) in a simple and efficient method.

The control of the display of the Gantt chart 10 by the display device 18 is controlled by the processing device 20, which can scroll the part of the Gantt chart 10 currently being shown, if user actions will select elements to highlight that are not already being shown by the display device 18. The processing device 20 can be controlled by a computer program product that is present on a computer readable medium such as a compact disc read-only memory (CD-ROM). The methodology presented here for the navigation of a Gantt chart is also applicable on other types of data processing systems, such as tablet computers or smart phones, where display and input technologies are combined in a single device. The principle remains the same, which is that four different logical actions are available to the user to allow them to navigate the Gantt chart.

Figure 8:
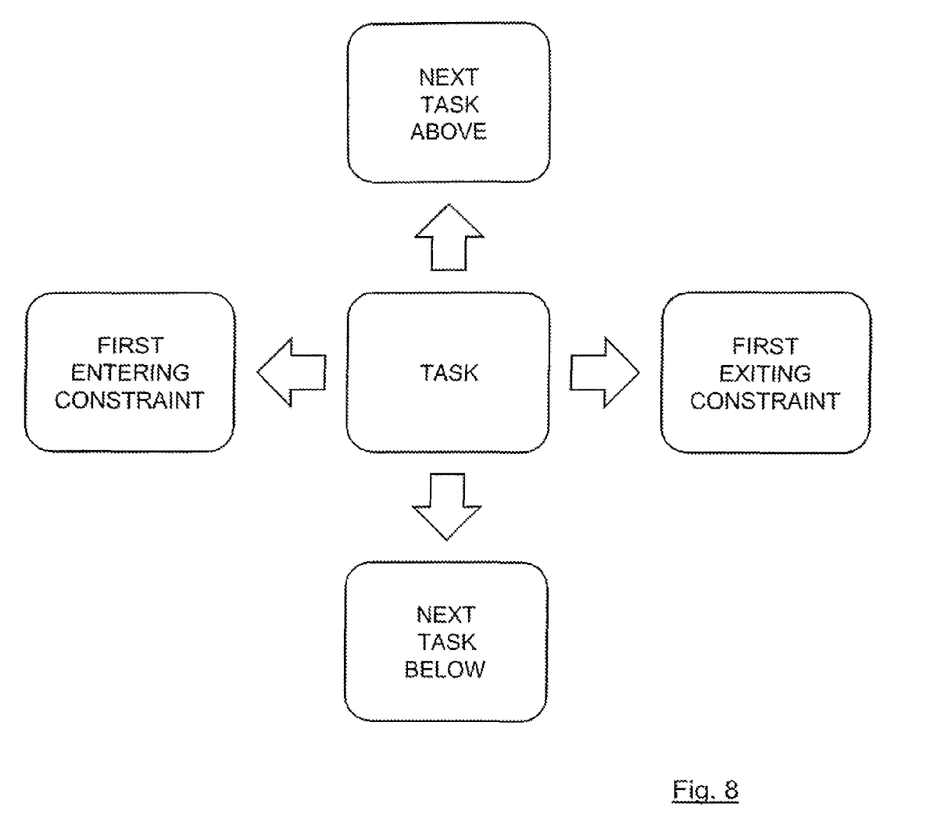
FIGS. 8 and 9 are schematic diagrams of a navigation scheme for a Gantt chart.
Figure 9:
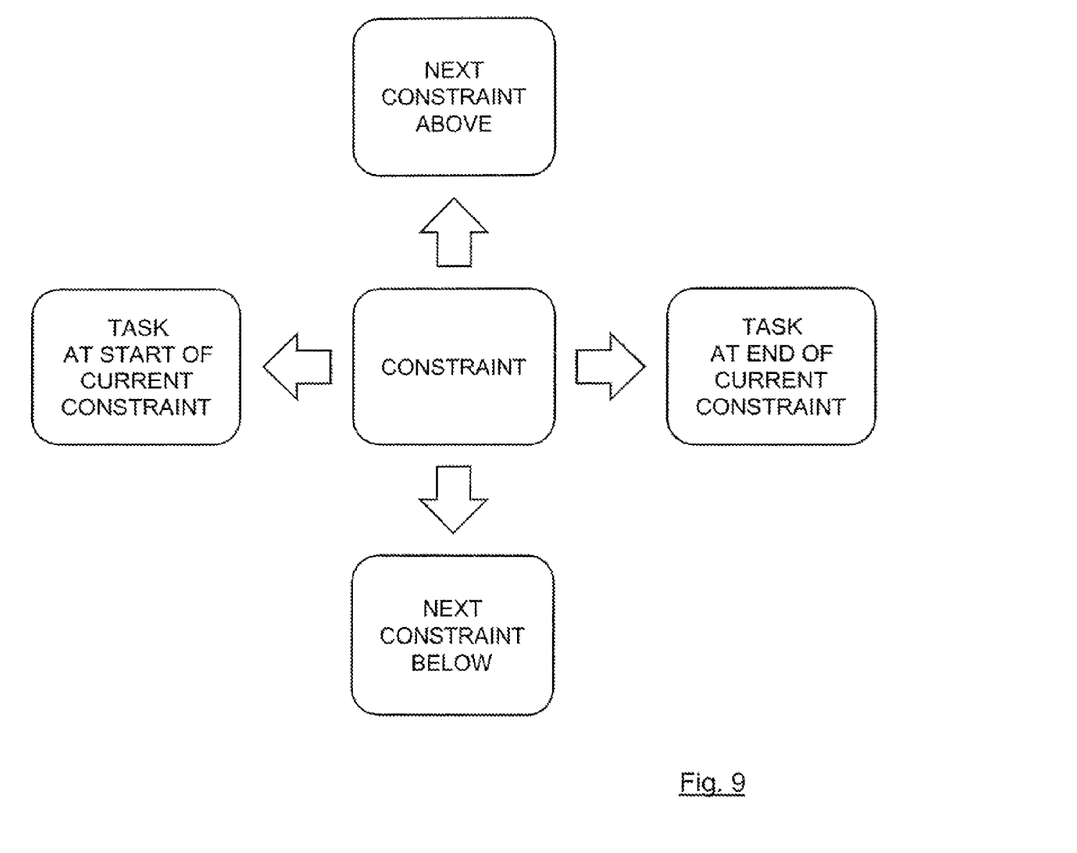

FIGS. 8 and 9 show the highlighting scheme for the Gantt chart navigation depending upon the logical action chosen by the user, which in one embodiment is the use of the arrow keys on the keyboard. In FIG. 8, a task is currently being highlighted, as shown by the central state "TASK". The four states around the central state illustrate the element that will be highlighted following the specific user input illustrated by the arrows from the central state. An up user input highlights the next higher displayed task above the previously highlighted task in the Gantt chart. A down user input highlights the next lower displayed task below the previously highlighted task in the Gantt chart. A forward user input highlights a constraint exiting the previously highlighted task in the Gantt chart and a back user input highlights a constraint entering the previously highlighted task in the Gantt chart.

Note that if the processing device is recording, in an ordered list, the tasks and constraints highlighted in response to the user inputs, then the forward and back actions will not necessarily highlight the first exiting or entering constraint, but will instead highlight the most recent entry in the list that matches a constraint in the bundle exiting or entering the currently highlighted task. This ensures a more logical passage through the Gantt chart, particularly if the user performs a series of actions that they are trying to effectively "undo", such as moving forward through a series of tasks and constraints, then the pressing of the back arrow key repeatedly should follow back through the same series of tasks and constraints (in reverse order).

FIG. 9 shows the same navigation scheme as FIG. 8, except that a constraint is currently being highlighted on the Gantt chart, as shown by the central state "CONSTRAINT". The four states around the central state illustrate the element that will be highlighted following the specific user input illustrated by the arrows from the central state. An up user input highlights the next higher displayed constraint connecting to the previously highlighted task in the Gantt chart. A down user input highlights the next lower displayed constraint connecting to the previously highlighted task in the Gantt chart. A forward user input highlights the task at the end of the currently highlighted constraint in the Gantt chart and a back user input highlights the task at the start of the currently highlighted constraint in the Gantt chart.

It is possible for a user, particularly a user with disabilities, to easily navigate a task-oriented Gantt chart as described above. The user is able to use a user interface device such as a keyboard to access to all the tasks, resources and constraints of such a Gantt chart. The user has four logical actions; forward, back, up and down, which can be mapped to the cursor keys of a standard keyboard, for example. These four logical actions allow the user to navigate through the tasks and constraints of a task-oriented Gantt chart in a simple and efficient manner, while being able to access all of the different components of the task-oriented Gantt chart without needing any additional user inputs or non-intuitive user inputs. The forward and back actions allow a user to move between tasks and connected constraints. The up and down actions allow a user to move between constraints that are connected to the last highlighted task (when a constraint is highlighted) and between tasks (when a task is highlighted).

In one embodiment, the method may further comprise, after highlighting a task in the Gantt chart, in response to receiving a down user input, highlighting the next lower displayed task below the previously highlighted task in the Gantt chart, or in response to receiving an up user input, highlighting the next higher displayed task above the previously highlighted task in the Gantt chart. Tasks may be navigated directly without the need to cycle through the constraints by simply using the logical up and down user inputs when a task is selected. This moves the on-screen highlighting up and down the rows in the Gantt chart.

The method may further comprise recording, in an ordered list, the tasks and constraints highlighted in response to the user inputs. As the user navigates around the Gantt chart, the tasks and constraints that are visited by the user may be recorded in an ordered list, which has added to it each task and constraint in turn. This can be used for various different purposes. For example, the method could further comprise detecting that the received user input is the logical opposite of the previous user input, obtaining the penultimate highlighted task or constraint from the recorded list and highlighting the obtained penultimate highlighted task or constraint. For example, a user may have a particular constraint highlighted and press the right arrow key (forward) to move to the task at the end of the constraint. The opposite action of pressing the left arrow key (backward) will highlight the same constraint rather than defaulting to the top constraint entering the specific task.

In one approach, the ordered list may be further used so that the method further comprises, after highlighting a task in the Gantt chart, in response to receiving a forward or back user input, detecting that a constraint respectively exiting or entering the previously highlighted task in the Gantt chart is present in the recorded list and highlighting the detected constraint. This is an extension of the above "opposite action" procedure described in the previous paragraph. By using the ordered list in this manner, if a user presses the right arrow key (forward), for example, multiple times, thereby moving through multiple constraints and tasks, pressing the left arrow key (backwards) multiple times will follow back, in reverse, the path that was taken in the forward movement, without the need for the user to continually select the constraint that they desire. This provides a far more logical and user friendly navigation of the Gantt chart, particularly when navigating back and forward through the task-oriented Gantt chart.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the embodiments in the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of operating a data processing system, the data system comprising a display device configured to display a Gantt chart, a processing device connected to the display device, and one or more user input devices connected to the processing device, wherein the method comprises:
   highlighting a task in the Gantt chart, the Gantt chart comprising a plurality of tasks and a plurality of constraints, each constraint connecting two tasks;
   in response to receiving a forward user input, highlighting a constraint exiting a previously highlighted task in the Gantt chart, or in response to receiving a back user input, highlighting a constraint entering the previously highlighted task in the Gantt chart; and
   in response to receiving a down user input that follows the forward user input, highlighting a next lower displayed constraint connecting to the previously highlighted task in the Gantt chart, or in response to receiving an up user input that follows the forward user input, highlighting a next higher displayed constraint connecting to the previously highlighted task in the Gantt chart.

2. The method according to claim 1, further comprising in response to receiving the down user input, highlighting a next lower displayed task below the previously highlighted task in the Gantt chart after highlighting a task in the Gantt chart, or in response to receiving the up user input, highlighting a next higher displayed task above the previously highlighted task in the Gantt chart after highlighting a task in the Gantt chart.

3. The method according to claim 1, further comprising recording, in an ordered list, tasks and constraints highlighted in response to user inputs.

4. The method according to claim 3, further comprising detecting that a received user input is a logical opposite of a previous user input, and obtaining one of a penultimate highlighted task and a penultimate constraint from a recorded list, and highlighting one of the obtained penultimate highlighted task and the penultimate constraint.

5. The method according to claim 3, further comprising after highlighting a task in the Gantt chart, in response to receiving one of the forward user input and the back user input, detecting that a constraint is respectively exiting or entering the previously highlighted task in the Gantt chart is present in the recorded list, and highlighting the detected constraint.

6. A data processing system comprising:
   a display device;
   a processing device connected to the display device and one or more user input devices connected to the processing device, the display device configured to:
      display a Gantt chart comprising a plurality of tasks and a plurality of constraints, each constraint connecting two tasks;
      highlight a task in the Gantt chart;
      in response to receiving a forward user input, highlight a constraint exiting a previously highlighted task in the Gantt chart, or in response to receiving a back user input, highlighting a constraint entering the previously highlighted task in the Gantt chart; and
      in response to receiving a down user input that follows the forward user input, highlighting a next lower displayed constraint connecting to the previously highlighted task in the Gantt chart, or in response to receiving an up user input that follows the forward user input, highlighting a next higher displayed constraint connecting to the previously highlighted task in the Gantt chart.

7. The data processing system according to claim 6, wherein the display device is further configured to highlight a next lower displayed task below the previously highlighted task in the Gantt chart after highlighting the task in the Gantt chart, in response to receiving the down user input, or in response to receiving the up user input, to highlight the next higher displayed task above the previously highlighted task in the Gantt chart after highlighting the task in the Gantt chart.

8. The data processing system according to claim 6, wherein the processing device is configured to record, in an ordered list, tasks and constraints highlighted in response to user inputs.

9. The data processing system according to claim 8, wherein the processing device is configured to detect that a received user input is a logical opposite of a previous user input, and obtain one of a penultimate highlighted task and a penultimate constraint from the recorded list, and wherein the display device is configured to highlight one of the obtained penultimate highlighted task and the penultimate constraint.

10. The data processing system according to claim 8, wherein after the processing device highlights a task in the Gantt chart, in response to receiving one of the forward user input and the back user input, detecting that a constraint is respectively exiting or entering the previously highlighted task in the Gantt chart is present in the recorded list, and wherein the display device is configured to highlight the detected constraint.

11. A computer program product for navigating a Gantt chart displayed by a display device, the computer program product comprising a non-transitory computer readable storage medium having computer readable program code embodied therewith, the computer readable program code being executable by a processing device to:
   highlight a task in the Gantt chart, the Gantt chart comprising a plurality of tasks and a plurality of constraints, each constraint connecting two tasks;
   in response to receiving a forward user input, highlight a constraint exiting the previously highlighted task in the Gantt chart, or in response to receiving a back user input, highlight a constraint entering the previously highlighted task in the Gantt chart; and
   in response to receiving a down user input that follows the forward user input, highlight a next lower displayed constraint connecting to the previously highlighted task in the Gantt chart, or in response to receiving an up user input that follows the forward user input, highlight a next higher displayed constraint connecting to the previously highlighted task in the Gantt chart.

12. The computer program product according to claim 11, further comprising in response to receiving the down user input, highlighting a next lower displayed task below the previously highlighted task in the Gantt chart after highlighting the task in the Gantt chart, or in response to receiving the up user input, highlighting a next higher displayed task above the previously highlighted task in the Gantt chart after highlighting a task in the Gantt chart.

13. The computer program product according to claim 11, further comprising recording, in an ordered list, tasks and constraints highlighted in response to user inputs.

14. The computer program product according to claim 13, further comprising detecting that a received user input is a logical opposite of a previous user input, and obtaining one of a penultimate highlighted task and a penultimate constraint from the recorded list, and highlighting one of the obtained penultimate highlighted task and the penultimate constraint.

15. The computer program product according to claim 13, further comprising after highlighting a task in the Gantt chart, in response to receiving one of the forward user input and the back user input, detecting that a constraint is respectively exiting or entering the previously highlighted task in the Gantt chart is present in the recorded list, and highlighting the detected constraint.

\* \* \* \* \*